United States Patent Office 3,206,431
Patented Sept. 14, 1965

3,206,431
THERMOPLASTIC POLYMERS CONTAINING 3,5-DIALKYL-4-HYDROXYBENZOIC ACID ESTERS AS U.V. STABILIZERS
Marshall E. Doyle, Lafayette, Gunter S. Jaffe, Oakland, Edgar J. Smutny, San Francisco, and Paul H. Williams, Orinda, Calif., assignors to Shell Oil Company, New York, N.Y., a corporation of Delaware
No Drawing. Filed Sept. 15, 1964, Ser. No. 396,704
16 Claims. (Cl. 260—45.85)

This application is a continuation-in-part of copending application Serial No. 88,601, filed February 13, 1961, now U.S. Patent No. 3,168,429, issued February 2, 1965.

This invention relates to novel stabilized polymeric compositions and to their preparation. More particularly, it relates to polyolefin compositions stabilized against actinic degradation.

It is known that actinic radiation, particularly in the ultraviolet region, has a deleterious effect on both the appearance and properties of organic polymers. For example, normally colorless or light-colored polyesters yellow on exposure to sunlight, as do such cellulosics as cellulose acetate. Polystyrene discolors and cracks, with accompanying loss of its desirable physical properties when exposed to actinic light, while vinyl resins, such as vinyl chloride and vinyl acetate spot and degrade. The rate of air oxidation of polyolefins such as polyethylene and polypropylene is materially accelerated by ultraviolet light. Such compounds as the benzophenones have been used to stabilize the polymer against deterioration, but introduction of these compounds into the compositions creates additional problems such as, for example, that of undesirable color.

It is an object of the present invention to provide novel plastic compositions which are stable under actinic light. Another object of the invention is the provision of a process for preparing such stable plastic compositions. Polyolefin compositions stabilized against degradation by ultraviolet light and oxidative deterioration are yet another object of this invention, as are plastic compositions containing a novel actinic light stabilizer. Other objects will be apparent from the following description of the invention.

These objects are accomplished by the plastic composition which comprises an organic polymeric material normally subject to actinic degradation, containing a stabilizing amount of a compound selected from the group consisting of esters of 3,5-dialkyl-4-hydroxybenzoic acids whereof at least one of the alkyl groups is branched on the alpha carbon atom, and organic hydroxylic compounds. The latter are defined for purposes of the description and claims as organic compounds containing one or more hydroxyl groups, i.e., alcoholic and phenolic compounds.

The stabilizing compounds of this invention will be referred to herein as "actinic stabilizers," meaning compounds which protect a substrate from degradation which is due to the effect of incident actinic radiation. By actinic radiation is meant light, principally in the near ultraviolet region of about 2500–3700 A., which produces a chemical or physical change in the irradiated target. Because in plastics these changes produce harmful rather than beneficial results, the irradiation tends to shorten the useful life of the polymer.

The compositions of the invention are in general solid macromolecular products which may be transparent, white or light-colored, or colored. They comprise essentially a solid high polymer, e.g., one having a molecular weight in excess of about 500 and generally in excess of 20,000, which, in the absence of an actinic stabilizer, deteriorates upon prolonged exposure to actinic radiation.

The high polymer stabilized may be any solid organic polymer in which such degradation occurs. Typical of such polymers are the vinylic resins, such as the polyvinyl halides, particularly polyvinyl chloride, the polyvinyl esters, such as polyvinyl acetate, and copolymers thereof; the polyvinyl acetals, such as polyvinyl butyral; and the polyvinyl benzenes, such as polymerized styrene, divinyl benzene, vinyl toluene, and their copolymers. Also falling into this general class are the polyacrylates, such as polymerized methyl or ethyl acrylate; and the polymerized methacrylates, e.g., methyl methacrylate, ethyl methacrylate; and copolymers of such compounds.

Another class of resinous materials susceptible to ultraviolet degradation are the cellulose plastics, including such esters as cellulose acetate, cellulose propionate, cellulose butyrate, and cellulose acetate butyrate; cellulose nitrate and the like.

Polyesters, particularly those prepared by the reaction of a dihydric alcohol and a dibasic carboxylic acid, are also included in the resin compositions of the invention. Exemplary polyesters are those prepared from such glycols as ethylene or propylene glycol and such acids as terephthalic acid, isophthalic acid, or adipic or azelaic acids; maleic or fumaric acid, or phthalic anhydride. These resins tend to yellow severely on exposure to sunlight.

The effects of incident actinic radiation are not identical in all substrates, and the actinic stabilizers of this invention are not equally effective in all polymers. There are also differences in the actinic stability provided by chemically different esters of the general type used in this invention.

It has been found that the stabilizers of this invention are highly effective in protecting polyolefins, and particularly polymers of alpha-monoolefins. The preferred class of plastics in the compositions of the invention are, therefore, the polyolefins. The polymers of alpha-olefins stabilized by the compounds of the invention are those normally solid hydrocarbon polymeric materials which are obtained by polymerizing such monoolefins as ethylene; propylene; butene-1; pentene-1; 3-methyl-butene-1; hexene-1; 4-methyl-pentene-1; 4-methyl-hexene-1, 4,4-dimethyl-pentene-1; and the like, as well as their copolymers, e.g., ethylenepropylene copolymers and the like. Polymers of olefins having 3 to 8 carbon atoms are the preferred species.

The ester stabilizers are particularly effective in the actinic protection of polyolefins containing tertiary carbon atoms, i.e., polymers which have the configuration

in the polymer chain. This structure is particularly sensitive to attack by actinic radiation in practical environments. The most useful polymers of this structure are stereoregular, and particularly isotactic. Tertiary carbon atoms also occur, however, in syndiotactic and in atactic polyolefins, including homopolymers and copolymers. This invention is of outstanding advantage in providing stabilized stereoregular polypropylene of commercially satisfactory stability.

The stabilized polymeric compositions of the invention are those comprising a major amount of a polymer, such as those described above, in intimate admixture with one of certain organic esters of 3,5-dialkyl-4-hydroxybenzoic acid, whereof at least one of the alkyl groups is branched on the alpha carbon atom. These compounds are in general white or light-colored solids, compatible with the noted polymers, and have the considerable advantage of not discoloring or adding an undesirable color to compositions containing them.

The 3,5-dialkyl-4-hydroxybenzoic acids whose esters may be employed according to this invention have the structure

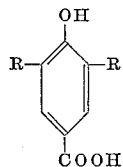

wherein each R is alkyl and at least one of the R's is branched on the alpha carbon atoms, i.e., is secondary or tertiary. The most effective stabilizers are those derived from acids wherein each R has from 3 to 8 carbon atoms.

Acids whose esters may be employed according to this invention include 3-methyl-5 isopropyl-4-hydroxybenzoic acid; 3-ethyl-5-tert-butyl-4-hydroxybenozic acid; 3-pentyl-5-tert-octyl-4-hydroxybenzoic acid, and the like. Preferred stabilizers are the esters of acids wherein each of the substituents R is branched on the alpha carbon atom. Exemplary of such acids are 3,5-diisopropyl-4-hydroxybenzoic acid, 3-isopropyl-5-tert-butyl-4-hydroxylbenzoic acid; 3,5-di-tert-butyl-4-hydroxybenzoic acid; 3-cyclohexyl-5-tert-butyl-4-hydroxybenzoic acid; 3,5-dicyclopentyl-4-hydroxybenzoic acid; and 3,5-di-tert-octyl-4-hydroxybenzoic acid. Most effective are the esters of acids wherein each R is a tertiary alkyl having up to 8 carbon atoms; outstandingly superior, for example, are the esters of 3,5-di-tert-butyl-4-hydroxybenzoic acid. These acids may be prepared by oxidation of the corresponding aldehyde; see Yohe et al., J. Org. Chem., 1289 (1956).

The above-enumerated acids themselves, and their anhydrides, are effective actinic stabilizers. Their use as stabilizers is described in our U.S. Patent No. 3,168,429, of which this patent is a continuation-in-part.

The acids, while useful actinic stabilizers, can have sufficient volatility to make them relatively undesirable for some uses. This drawback can be overcome by esterifying the acid with a suitable alcohol or phenol to produce a compound of reduced volatility.

The esters of these acids are characterized not only by lower volatility than that of the acids from which they are derived, but some of them also show greatly superior actinic radiation stabilizing properties.

One important class of esters is that made up of the 3,5-dialkyl-4-hydroxybenzoic acid esters of monohydroxyalkanols, -alkenols and -cycloalkanols. Preferred alcohols are those having from 8 to 20 carbon atoms; alkyl groups of $C_8$ and up are herein described "higher alkyl" groups. Preferred esters are those having at least 16 carbon atoms in the combined aliphatic and/or cycloaliphatic groups. These esters have the structure

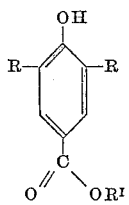

wherein each R has the above significance, and $R^I$ is an alkyl or cycloalkyl group having up to 20 carbon atoms. Representative esters of this type include methyl 3,5-di-tert-octyl-4-hydroxybenzoate; ethyl 3,5-di-tert-heptyl-4-hydroxybenzoate; cyclohexyl 3-octyl-5-tert-butyl-4-hydroxybenzoate; lauryl 3,5-di-tert-octyl-4-hydroxybenzoate; lauryl 3,5-di-tert-butyl-4-hydroxybenzoate; stearyl 3,5-di-tert-amyl-4-hydroxybenzoate; dodecyl-3,5-di-tert-butyl-4-hydroxybenzoate; allyl 3,5-di-tert-butyl-4-hydroxybenzoate; and the like.

Another important class of esters is that consisting of the 3,5-dialkyl-4-hydroxybenzoic acid esters of alkane polyols. Such polyols 30 may have up to 20 carbon atoms, but more conveniently have from 2 to 10 carbon atoms, and may have up to 6 hydroxyl groups, e.g., pentaerythritol, trimethylol ethane, or sorbitol. Preferred are those of alkylene glycols having up to about 10 carbon atoms. These compounds have the structure

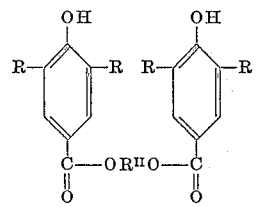

where each R has the significance noted above, and $R^{II}$ is alkylene. Typical diesters are those of ethylene glycol; propylene glycol; hexylene glycol; 1,5-pentanediol; and the like; particularly preferred is propane-1,3-di-(3,5-di-tert-butyl-4-hydroxybenzoate). The triesters of alkane triols having up to 10 carbon atoms, e.g., 1,2,6-hexanetriol, are also effective stabilizers. A typical ester of this type is pentane-1,3,5-tri(3,5-di-tert-amyl-4-hydroxybenzoate). Other useful relatively non-volatile stabilizers are pentaerythrityl-tetra(3,5 - diisopropyl - 4 - hydroxybenzoate) and sorbityl hexa(3,5-di-tert-butyl-4-hydroxybenzoate).

It has been found that one class of esters have actinic stabilizing activity which is unexpectedly much greater than the activity of the corresponding acid itself. This highly effective class are the esters of the above-enumerated acids with certain substituted monohydric phenols which have the general formula

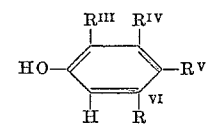

wherein each R represents a substituent selected from the class consisting of hydrogen, alkyl, cycloalkyl, aryl, alkoxy, carbalkoxy and halogen; the total number of carbon atoms in any alkyl substituent group is at least 4; and at least one of the groups $R^{III}$ and $R^V$ is not hydrogen while $R^{IV}$ and $R^{VI}$ are preferably hydrogen. In other words, these preferred esters are esters of 3,5-dialkyl-4-hydroxybenzoic acids and monohydric phenols in which phenols at least one ortho-position is open and either an ortho-position or the para-position or both one ortho-position and the para-position are substituted with an alkyl, cycloalkyl, aryl, alkoxy, carbalkoxy or halogen substituent. Particularly outstanding among this preferred group of esters are those of ortho-substituted or 2,4-disubstituted phenols in which the substituent group is relatively bulky, such as a tertiary alkyl group, a bromine atom, a phenyl group, or a carbalkoxy-group.

Representative of preferred phenols of the above-described groups are o-tert-butyl phenol; o-tert-octyl phenol; o-phenyl phenol; o-cyclohexyl phenol; o-chloro phenol; o-methoxy phenol; p-tert-butyl phenol; p-octyl phenol;

p-decyl phenol; p-phenyl phenol; p-bromo phenol; p-propoxy phenol; p-carbethoxy phenol; 2,4-di-tert-butyl phenol; 2,4-di-tert-amyl phenol; 2,4-di-tert-octyl phenol; 2-isopropyl-4-tert amyl phenol; 2-ethyl-4-tert-hexyl phenol; 2-bromo-4-tert-butyl phenol; 2-phenyl-4-octyl phenol; 2-tert-butyl-4-methoxy phenol; and the like.

Illustrative esters are those of any of the above phenols with 3,5-dialkyl-4-hydroxybenzoic acids, such as o-tert-butylphenyl-3,5-di-tert-butyl-4-hydroxybenzoate; o-chlorophenyl-3,5-di-tert-heptyl-4 - hydroxybenzoate; p - phenylphenyl-3-octyl-5-tert-butyl-4-hydroxybenzoate; 2 - bromo-4-tert-butylphenyl-3,5-diisopropyl-4-hydroxybenzoate; and the like.

In addition to esters of these specially preferred phenols, useful actinic stabilizers also include the 3,5-dialkyl-4-hydroxybenzoic acid esters of other phenols and aromatic polyols, including those having substituents selected from the group R above, but located on the phenol in positions which fall outside the preferred structures. Suitable esters of this group are those wherein the hydroxyl compounds are mononuclear compounds wherein each of the hydroxyl groups is directly connected to a ring carbon atom. Typical aromatic hydroxyl-compounds of this group include phenol, the xylenols, durenol, the cresols, hydroquinone, 3,5-dimethyl hydroquinone, resorcinol, and phloroglucinol. Less preferred are the esters of the naphthols, e.g., alpha-naphthol, beta-naphthol, alpha-methyl naphthol, and the like.

Representative of these compounds are 2',4'-dimethylphenyl 3,5-di-tert-amyl-4-hydroxybenzoate; naphthyl 3,5-diisopropyl-4-hydroxybenzoate; phenyl 3,5-di-tert-octyl-4-hydroxybenzoate; naphthyl 1,5-di(3,5-di-tert-butyl-4 - hydroxybenzoate); and benzene 1,3,5-tri(3,5-di-tert-butyl-4-hydroxybenzoate).

Another effective group of stabilizers are esters of aryl alkanols, such as the ester of benzyl alcohol and of alkyl-substituted benzyl alcohols.

The esters are readily prepared by reaction of the described acids with the noted alcohols or phenols, preferably in liquid phase and in the presence of an esterification catalyst, such as sulfuric acid.

The stabilizer is incorporated in the resin to afford a stable homogeneous composition. For example, mechanical methods, such as Banburying or hot milling may be employed to combine the stabilizer with the solid resin. Where the polymer is prepared from a liquid monomer, as in the case of styrene or methyl methacrylate, the stabilizer may be dispersed or dissolved in the monomer prior to polymerization or curing. The stabilizer is also conveniently incorporated in a slurry of finely divided particles of the resins to be stabilized, such as may be produced during the manufacture of polymer. The latter method is particularly suitable in the manufacture of polypropylene since protection against actinic radiation can be provided prior to the first exposure of the resin to actinic light.

Only sufficient stabilizer is required to stabilize the polymer against actinic degradation. Depending on the nature of the polymer, the particular stabilizer employed, and the severity of exposure of the resulting composition, from about 0.001% to 10% by weight of the stabilizer, based on the polymer, will be required. In most cases, however, from about 0.1% to about 1% on the same basis will be sufficient.

In addition to the actinic stabilizers described, the plastic compositions of the invention may contain other additives such as plasticizers, pigments, fillers, dyes, glass or other fibers, thermal antioxidants, and the like. For example, in most applications, it will be desirable to incorporate into the resin compositions sufficient thermal antioxidant to protect the plastic against thermal and oxidative degradation. The amount of antioxidant required will be comparable to that of the actinic stabilizer, i.e., from about 0.001% to about 10% by weight, based on the polymer. Representative of such antioxidants are amino compounds such as diisopropanolamine; p-phenylene diamine and durene diamine; phosphite esters, such as triphenyl phosphite and dibutyl phosphite and alkyl aryl phosphite such as dibutyl phenyl phosphite, and the like.

The best results are obtained with a preferred class of thermal antioxidants, the hindered phenols. These compounds have been found to provide the best thermal stabilization with the least attendant discoloration in the compositions of the invention. These phenols may be mononuclear, as in the case of 2,6-di-tert-butylphenol; 2,6-di-tert-butyl-4-methylphenol; 2,6-diisopropyl - 4 - methoxymethylphenol; 2,6-di-tert-butyl-4 - hydroxymethylphenol; and 2,4-dimethyl-6-tert-butyl-phenol; or they may be polynuclear. Particularly preferred polynuclear phenols are the biphenols, such as 3,3',5,5'-tetra-tert-butyl - biphenol and 3,3',5,5'-tetraisopropyl-biphenol; and such bisphenols as bis(3,5-di-tert-butyl-4-hydroxyphenyl)methane; bis(3-tert-butyl-5-methyl-2-hydroxyphenyl)methane; and bis(3-tert-butyl-5-methyl-2-hydroxyphenyl)sulfide. Other polynuclear phenolic compounds which are effective antioxidants include the bis(3,5-dialkyl-4-hydroxybenzyl)durenes, such as bis(3,5-di-tert-butyl-4 - hydroxybenzyl)durene; the polyphenolic phenols, such as 2,4,6-tris(3,5-di-tert-amyl - 4 - hydroxybenzyl)phenol; such polyphenolic benzenes as 1,3,5-trimethyl-2,4,6-tris(3,5-di-tert-butyl - 4-hydroxybenzyl)benzenes; and the di(3,5-dialkyl - 4 - hydroxybenzyl) polynuclear aromatics, such as 9,10-bis(3,5-di-tert-butyl-4-hydroxybenzyl)anthracene and 1,4-bis(3,5-diisopropyl-4-hydrobenzyl)naphthalene.

The hindered phenolic antioxidants may be used in combination with sulfur compounds which improve their antioxidant properties, i.e., which act as synergists for the phenolic antioxidants. Typical of such sulfur compounds are dialkyl beta thiodipropionates such as the di-lauryl and the di-stearyl beta thiodipropionate; higher alkyl disulfides, such as cetyl disulfide; and other compounds having sulfide linkages.

The best plastic compositions consisting essentially of a solid organic polymeric material of the type described and containing stabilizing amounts of a preferred 3,5-dialkyl-4-hydroxybenzoic actinic stabilizer and of a preferred phenolic antioxidant are characterized by extreme physical and chemical durability at elevated temperatures and extended exposures to ultraviolet radiation. Furthermore, when light-colored or transparent resinous products of such compositions are prepared, they do not discolor under even the most severe conditions of use.

The following examples will illustrate the nature and advantages of the compositions of the invention. It should be understood, however, that the examples are merely illustrative and are not to be regarded as limitations to the appended claims, since the basic teachings thereof may be varied at will, as will be understood by one skilled in the art.

EXAMPLES 1–18

A series of plastic compositions were prepared by milling samples of polypropylene for five minutes at 190° C. with samples of the following compounds. From these compositions, compression molded films of about 5 mil thickness were formed, and these films were exposed to untraviolet irradiation in a modified Atlas Weatherometer.

In the modified instrument, the conventional arc light source was supplemented with eight fluorescent ultraviolet light sources. All film samples passed within a quarter inch of the light sources. It has been found that in this accelerated test, conditions are about eight times as stringent as in the unmodified Weatherometer.

The samples were periodically tested by bending through 180°. The number of days required before each film broke on bending is shown in the following table.

The samples tested each contained 0.5% w. of the candidate stabilizer. The samples also contained 0.1% w. of a highly effective antioxidant, bis(3,5-di-tert-butyl-4-hydroxybenzyl)durene.

Table I

| Example | Additive | Fadeometer Days |
|---|---|---|
| 1 | None | 4½ |
| 2 | 3,5-di-tert-butyl-4-hydroxybenzoic acid | 14 |
| 3 | 2',4'-di-tert-butylphenyl 3,5-di-tert-butyl-4-hydroxybenzoate | 20½ |
| 4 | p-Octylphenyl 3,5-di-tert-butyl-4-hydroxybenzoate.[a] | 20½ |
| 5 | p-Carbethoxyphenyl 3,5-di-tert-butyl-4-hydroxybenzoate | 18 |
| 6 | 2-chloro-4-octylphenyl 3,5-di-tert-butyl-4-hydroxybenzoate | 17 |
| 7 | p-Bromophenyl 3,5-di-tert-butyl-4-hydroxybenzoate | 15 |
| 8 | o-Phenylphenyl 3,5-di-tert-butyl-4-hydroxybenzoate | 14 |
| 9 | p-Phenylphenyl 3,5-di-tert-butyl-4-hydroxybenzoate | 14 |
| 10 | p-Methoxyphenyl 3,5-di-tert-butyl-4-hydroxybenzoate | 14 |
| 11 | Phenyl 3,5-di-tert-butyl-4-hydroxybenzoate | 12 |
| 12 | Lauryl 3,5-di-tert-butyl-4-hydroxybenzoate | 13½ |
| 13 | Allyl 3,5-di-tert-butyl-4-hydroxybenzoate | 12½ |
| 14 | Benzyl 3,5-di-tert-butyl-4-hydroxybenzoate | 11½ |
| 15 | 1,3-propane di (3,5-di-tert-butyl-4-hydroxybenzoate) | 14 |
| 16 | Propane 1,2,3-tri(3,5-di-tert-butyl-4-hydroxybenzoate) | 8½ |
| 17 | 2,3,5,6-tetramethylbenzene 1,4-di(3,5-di-tert-butyl-4-hydroxybenzoate) | 7½ |
| 18 | Benzene-1,3,5-tri(3,5-di-tert-butyl-4-hydroxybenzoate) | 7½ |

[a] The predominant isomer is p-1, 1, 3, 3-tetramethyl butylphenyl 3,5-di-tert-butyl-4-hydroxybenzoate.

Similar results are obtained when these compounds are incorporated in polyethylene, in isotactic polybutene, or in isotactic poly-4-methyl-1-pentene.

EXAMPLE 19

A blend of 70 parts paraffin wax and 30 parts of an ethylene-propylene copolymer is divided into samples A, B and C. Sample A is tested without inhibitor. Sample B is blended with 0.9% by weight of an excellent antioxidant, tris(3,5-di-tert-butyl - 4 - hydroxybenzyl)mesitylene. Sample C is blended with 0.8% by weight of p-octylphenyl 3,5-di-tert-butyl-4-hydroxybenzoate. Samples of these compositions are exposed in a Fadeometer in the same manner as Examples 1–18. The Fadeometer days to failure are 9 days for Sample A, 11 days for Sample B, and 16 days for Sample C.

The ethylene-propylene copolymer is one prepared with a Ziegler type catalyst; it has an ethylene content of approximately 90%, an intrinsic viscosity of about 3, and is thermoplatsic, not rubbery.

EXAMPLE 20

Addition of 2% p-octylphenyl 3,5-di-tert-butyl-3-hydroxybenzoate and 1%, 2,6-di-tert-butyl-4-methylphenol to a hydrocarbon oil employed in 2% concentration as an extending oil for polyvinyl chloride compositions lessens the discoloration of the composition under the influence of actinic radiation.

EXAMPLE 21

Blending p-octylphenyl 3,5-di-tert-butyl-4-hydroxybenzoate and 2,6-di-tert-butyl-4-methylphenol with high impact polystyrene results in lessened discoloration of the composition under the influence of actinic radiation. Similar results are obtained when the compounds are blended with polymethyl methacrylate.

The above examples illustrate particularly the use of various esters of 3,5-di-tert-butyl-4-hydroxybenzoic acid. Esters of other 3,5-di-alkyl-4-hydroxybenzoic acid, such as acids in which one or both alkyl groups are tert-amyl-, tert-hexyl-, or branched octyl groups can be used in identical manner and lead to similar results.

A widely propounded theory of actinic degradation of polyolefins holds that a small number of carbonyl groups, unavoidably present in polyolefins, absorb incident actinic energy and are thereby broken down to free radicals, which react with oxygen to form peroxides, these in turn being instrumental in the degradation of the polymer. It is well known that many phenolic compounds whose phenolic hydroxyl group is sterically hindered are excellent antioxidants in various organic substrates. This is true, for example, of the hydroxy-benzyl alcohols of Morris, U.S. Patent 3,085,003. At first glance, one might suppose that the increased effectiveness of the stabilizers of this invention is due to an improvement in their antioxidant properties by virtue of the hindered phenol structure of the acid moiety of the ester. In other words, one might suppose that, even if the compounds of this invention were no more effective in neutralizing incident actinic radiation, they might stabilize polyolefins more effectively by destroying the peroxides before the latter have had a chance to attack the polyolefin, in the same manner, for example, as the hindered hydroxybenzyl alcohols of said Morris patent.

We have overwhelming experimental evidence to support the conclusion that the antioxidant properties of the stabilizer of this invention are not significantly involved in the mechanism by which they stabilize polymers against the influence of actinic radiation.

(1) It has been found that actinic stabilizers of this invention for example the 3,5-di-tert-butyl-4-hydroxybenzoate of 2,4-di-tert-butyl phenol, do not contribute significantly to the oxidation stability of polypropylene.

(2) The stabilizing effect of the actinic stabilizers of this invention has been tested in polymers which contain highly effective antioxidant stabilizers in sufficient concentration so that any improvement in protection of the substrate could not possibly result merely from improved protection against the effect of oxygen by virtue of possible antioxidant properties of the actinic stabilizers.

(3) A study of the chemical mechanism of the actinic protective effect has given strong evidence that the actinic stabilizers of this invention have an outstanding ability to absorb energy from species which have become excited by incident actinic radiation and to permit energy thus absorbed to dissipate harmlessly, i.e., without leading to any polymer-degrading species. Hence, no oxidation-protective mechanism comes into play in the action of the compounds of this invention. The study which led to this conclusion used as its main tool the quenching of fluorescence by compounds under study, dissolved in toluene. It was found that the effectiveness of compounds in quenching fluorescence correlated excellently with their observed effectiveness as actinic stabilizers of polyolefins. On the other hand, excellent hindered phenolic antioxidants, such as the 3,5-di-tert-butyl-4-hydroxybenzyl alcohol of Morris, showed little fluorescence-quenching activity.

We claim as our invention:

1. A plastic composition comprising a normally solid, organic, thermoplastic polymer subject to actinic degradation, containing a stabilizing amount of an ester of (a) 3,5-dialkyl-4-hydroxybenzoic acid whereof at least one of the alkyl groups is branched on the alpha carbon atom, and (b) a hydrocarbon compound substituted with at least one hydroxyl group, in which any additional substituents are radicals selected from the group consisting of hydrocarbon radicals, alkoxy radicals, carbalkoxy radicals and halogen radicals.

2. The plastic composition of claim 1 wherein the organic polymeric material is a polymer of an alpha-monoolefin of 3 to 8 carbon atoms per molecule.

3. The plastic composition of claim 1 wherein the organic polymeric material is a predominantly stereoregular polymer of propylene.

4. A plastic composition comprising solid stereoregular polypropylene containing a stabilizing amount of an ester of (a) 3,5-dialkyl-4-hydroxybenzoic acid whereof at least one of the alkyl groups is branched on the alpha carbon atom, and (b) a phenol in which any additional substituents are selected from the group consisting of alkyl, cycloalkyl, aryl, alkoxy, carbalkoxy and halogen radicals.

5. A plastic composition comprising solid stereoregular polypropylene containing a stabilizing amount of an ester of (a) 3,5-dialkyl-4-hydroxybenzoic acid whereof at least one of the alkyl groups is branched on the alpha carbon atom, and (b) a phenol having at least one open ortho position and having at least one substituent R in one of the ortho and para positions and no substituent other than R, R being selected from the group consisting of alkyl, cycloalkyl, aryl, halogen, alkoxy and carbalkoxy groups, the total number of carbon atoms in alkyl groups in said phenol, if present, being at least 8.

6. A plastic composition comprising solid stereoregular polypropylene containing a stabilizing amount of an ester of (a) 3,5-dialkyl-4-hydroxybenzoic acid whereof at least one of the alkyl groups is branched on the alpha carbon atom, and (b) an alcohol selected from the group consisting of aliphatic and cycloaliphatic monohydric, dihydric and polyhydric alcohols free of other non-hydrocarbon substituents.

7. A plastic composition comprising polypropylene containing a stabilizing amount, in the range from about 0.1 to about 1 percent by weight, of 2',4'-di-tert-butylphenyl 3,5-di-tert-butyl-4-hydroxybenzoate.

8. A plastic composition according to claim 7, containing an amount, in the range from 0.1 to about 1 percent by weight, of a sterically hindered phenolic antioxidant.

9. The composition of claim 8 in which said antioxidant is bis(3,5-di-tert-butyl-4-hydroxybenzyl)durene.

10. The composition of claim 8 in which said antioxidant is tris(3,5-di-tert-butyl-4-hydroxybenzyl)mesitylene.

11. A plastic composition comprising polypropylene containing a stabilizing amount, in the range from about 0.1 to about 1 percent by weight, of p-octylphenyl 3,5-di-tert-butyl-4-hydroxybenzoate.

12. A plastic composition comprising polypropylene containing a stabilizing amount, in the range from about 0.1 to about 1 percent by weight, of p-carbethoxyphenyl 3,5-di-tert-butyl-4-hydroxybenzoate.

13. A plastic composition comprising polypropylene containing a stabilizing amount, in the range from about 0.1 to about 1 percent by weight, of 2-chloro-4-octylphenyl 3,5-di-tert-butyl-4-hydroxybenzoate.

14. A plastic composition comprising polypropylene containing a stabilizing amount, in the range from about 0.1 to about 1 percent by weight of higher alkyl-3,5-di-tert-butyl-4-hydroxybenzoate.

15. A plastic composition comprising polypropylene containing a stabilizing amount, in the range from about 0.1 to about 1 percent by weight, of lauryl-3,5-di-tert-butyl-4-hydroxybenzoate.

16. A plastic composition comprising polypropylene containing a stabilizing amount, in the range from about 0.1 to about 1 percent by weight, of 1,3-propane-di(3,5-di-tert-butyl-4-hydroxybenzoate).

References Cited by the Examiner

UNITED STATES PATENTS

| 2,464,250 | 3/49 | Moll et al. | 260—45.85 |
| 3,085,003 | 4/63 | Morris | 260—45.95 |

OTHER REFERENCES

Lundberg, W. O.: "Antioxidation and Antioxidants," vol. II, 1962, John Wiley & Sons, Inc., pp. 931–939.

LEON J. BERCOVITZ, *Primary Examiner.*

UNITED STATES PATENT OFFICE
CERTIFICATE OF CORRECTION

Patent No. 3,206,431  September 14, 1965

Marshall E. Doyle et al.

It is hereby certified that error appears in the above numbered patent requiring correction and that the said Letters Patent should read as corrected below.

Column 1, line 13, for "3,168,429" read -- 3,168,492 --.

Signed and sealed this 5th day of September 1967.

(SEAL)
Attest:

ERNEST W. SWIDER  
Attesting Officer

EDWARD J. BRENNER  
Commissioner of Patents